(No Model.)

J. DWIGHT.
POLE FOR LAWN TENNIS NETS.

No. 282,506. Patented Aug. 7, 1883.

WITNESSES    INVENTOR

UNITED STATES PATENT OFFICE.

JAMES DWIGHT, OF BOSTON, MASSACHUSETTS.

POLE FOR LAWN-TENNIS NETS.

SPECIFICATION forming part of Letters Patent No. 282,506, dated August 7, 1883.

Application filed June 25, 1883. (No model.)

*To all whom it may concern:*

Be it known that I, JAMES DWIGHT, of Boston, in the county of Suffolk and State of Massachusetts, have invented certain new and useful Improvements in Poles for Lawn-Tennis Nets, of which the following is a specification.

The game of lawn-tennis is commonly played upon a court or level space of lawn or earth. In this game a net held up at either end by a pole is employed, and strict rules are observed as to its height, length, &c. The poles by which this net is held up in its place require to be moved frequently, so as to avoid the wear upon the turf or ground that is inevitable when the game is played too constantly upon the same spot. It is also desirable to take down the poles and net for the night, or when otherwise not in use, and when replaced or set up they must be accurate both in height and position. These various uses of the poles call for certain capabilities, which it is the object of my invention to supply.

In the accompanying drawings I have shown a pair of these poles with their net, in illustration of their use and also of the improvements which I have made.

Figure 1:
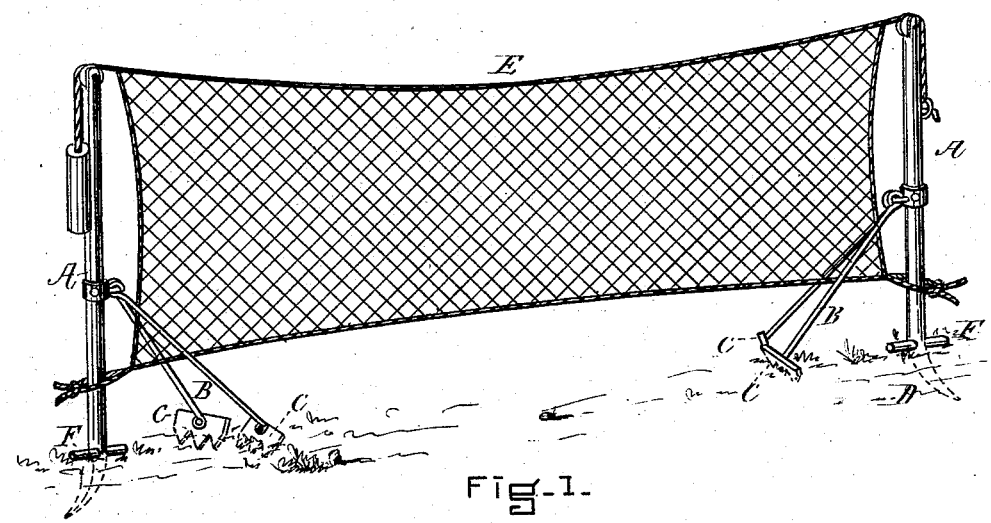
Figures 2, 3:
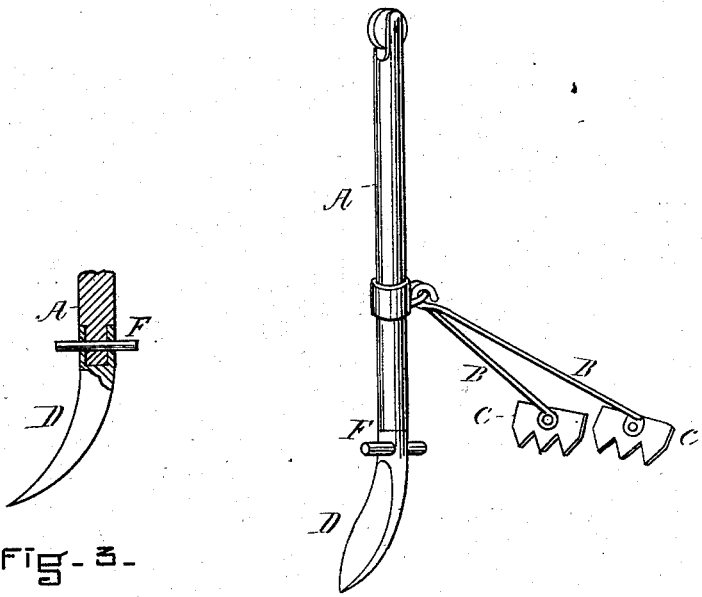

Figure 1 is a perspective view of a net and its poles. Figs. 2 and 3 illustrate details of the construction of the pole and stay.

To make the pole capable of retaining its upright position against the strong inward pull of the weight of the net and the varying tension of the absorbent material of which it is commonly made, especially in the soft turf on which the game is usually played, I make that portion, D, of the pole which enters the turf to curve outwardly or away from the net. The right degree for this curve I find in practice to be the greatest that will allow the pole to be inserted readily into the ground, varying, of course, with its character or softness. I prefer also, both for convenience of insertion and to get a better bearing, to flatten the outer face of the curved part, or that face away from the net. This curved part of the pole may be integral with the rest, or may be made separate, as shown at Fig. 3, with a socket or other convenient means of attachment.

To insure the height of the pole being according to the rule in the game as played by the best players—viz., three feet six inches from the ground—the pole may be provided with a pin or stop, F, set at a right angle to the length of the pole at a point three feet, six inches from the top of the net. To assist in securing and maintaining the upright position of the pole, it is provided with rigid stay-rods B, extending from a point about midway between the ground and the point where the poles receive the net-rope. These stay-rods may be conveniently attached to the pole by means of the collar and eye, as shown in Figs. 1 and 2. Each of these rods, according to my preferred construction, has a bearing at its lower end, or where it meets the ground, in the form of a plate, C, which, in practice, is driven into the turf, and this plate may conveniently be made separate from the rod and pivoted to it, so as to allow motion to the plate in its own plane, but so that there shall not be play in the direction of the strain or thrust of the stay itself, which I prefer to make substantially at a right angle to the bearing-face of the plate. The distance from the point where the stay-rod meets the ground to the point where it meets the pole is from one foot six inches to two feet, the precise distance depending to some extent upon the softness of the ground in which the poles are to be used.

To enable the stay-plates to be readily set in place, I intend, in practice, to form their lower edge in a point or points, as shown.

I claim—

1. A pole for lawn-tennis nets, consisting, essentially, of a straight or above-ground part of the height required, and an underground part curved outward or away from the net and in the direction of its length, substantially as and for the purposes set forth.

2. A pole for lawn-tennis nets, having a straight or above-ground part, provided with an inwardly-projecting stay-piece and an outwardly-curved underground part, substantially as described.

3. In a pole for lawn-tennis nets, the combination of an upper part, A, a stay-piece, B, having its ends provided with a stay-plate, C, and the curved outwardly-extending underground part D.

4. In combination, a tennis-net, E, and two supporting-poles, each having a straight upper or above-ground part, A, a stay-piece, B, and a curved outwardly-extending underground part, D, all substantially as described.

In testimony whereof I have hereunto subscribed my name this 23d day of June, A. D. 1883.

JAMES DWIGHT.

Witnesses:
 ALEX. P. BROWNE,
 GEORGE O. G. COALE.